US012719858B2

(12) United States Patent
John et al.

(10) Patent No.: US 12,719,858 B2
(45) Date of Patent: *Aug. 25, 2026

(54) AUTOMATED LOGIN FRAMEWORK FOR INTERACTING WITH DYNAMICALLY GENERATED LOGIN FORMS

(71) Applicant: Rapid7, Inc., Boston, MA (US)

(72) Inventors: Jijo John, London (CA); Dan Kuykendall, La Mirada, CA (US)

(73) Assignee: Rapid7, Inc., Boston, MA (US)

( * ) Notice: Subject to any disclaimer, the term of this patent is extended or adjusted under 35 U.S.C. 154(b) by 153 days.

This patent is subject to a terminal disclaimer.

(21) Appl. No.: 18/823,759

(22) Filed: Sep. 4, 2024

(65) Prior Publication Data

US 2024/0430254 A1 Dec. 26, 2024

Related U.S. Application Data

(63) Continuation of application No. 17/748,733, filed on May 19, 2022, now Pat. No. 12,107,848.

(51) Int. Cl.
*H04L 29/06* (2006.01)
*H04L 9/40* (2022.01)

(52) U.S. Cl.
CPC ........ *H04L 63/083* (2013.01); *H04L 63/1433* (2013.01)

(58) Field of Classification Search
CPC ........................ H04L 63/1433; H04L 63/1408
See application file for complete search history.

(56) References Cited

U.S. PATENT DOCUMENTS

2002/0010855 A1* 1/2002 Reshef ................ H04L 63/1433 380/255
2016/0078146 A1* 3/2016 Simpson ............... G06F 40/143 715/234

* cited by examiner

*Primary Examiner* — Izunna Okeke
(74) *Attorney, Agent, or Firm* — Ashwin Anand

(57) ABSTRACT

An automated login framework for dynamic application security testing is disclosed. A web application executing on a computing device is accessed and an automated login framework (ALF) is injected into an onload event of a web browser associated with the web application. The ALF is then accessed with a credential associated with the web application. A login page associated with application is identified by matching links or buttons with a user-defined regular expression and a user-defined wordlist. Then, a login form in the login page is detected by executing a signature technique, a dictionary technique, and a multistep signature technique. The login form is populated using the credential and submitted for authentication, and a status with a confidence score is received indicating whether the authentication was successful or failed.

20 Claims, 5 Drawing Sheets

100

200

Automated Login Framework (ALF)
135

Login Page Manager
140

NavigationByRegex
205

NavigationByXpath
210

Login Form Manager
145

Signature Techniques
215(1)-(N)

Dictionary Techniques
220(1)-(N)

Multistep Signature Techniques
225(1)-(N)

Authentication Manager
150

Authentication Status
230

Authentication Confidence
235

Web Application Scanner
155

Authentication-Dependent Web Applications
240(1)-(N)

AUTOMATED LOGIN FRAMEWORK FOR INTERACTING WITH DYNAMICALLY GENERATED LOGIN FORMS

CROSS-REFERENCE TO RELATED APPLICATIONS

This application is a continuation of and claims priority to U.S. patent application Ser. No. 17/748,733, filed May 19, 2022, which is a continuation-in-part (CIP) of and claims priority to both (1) U.S. patent application Ser. No. 17/545,022, filed Dec. 8, 2021 (which is a continuation of U.S. patent application Ser. No. 16/545,044, filed Aug. 20, 2019, now U.S. Pat. No. 11,228,611, issued on Jan. 18, 2022) and (2) U.S. patent application Ser. No. 17/522,074, filed Nov. 9, 2021 (which is a continuation of U.S. patent application Ser. No. 16/564,029, filed Sep. 9, 2019, now U.S. Pat. No. 11,201,892, issued on Dec. 14, 2021), which are all hereby incorporated by reference in their entirety.

BACKGROUND

Field of the Disclosure

This disclosure is related is to dynamic application security testing (DAST). In particular, this disclosure is related to an automated login framework (ALF) for authenticating web applications for dynamic application security testing purposes.

Description of the Related Art

Web application scanning involves crawling a website to discover and evaluate security vulnerabilities within web applications. Such web application scanning software tools are called web application scanners or vulnerability scanners. After analyzing discoverable web pages and files, the scanner builds a software structure of a website. However, because the scanner does not have access to the source code of the web application to analyze the code for vulnerabilities (e.g., like in the case of Static Application Security Testing (SAST) tools), the scanner performs simulated attacks against the web application and analyzes the results. Therefore, web application scanning is an integral part of Dynamic Application Security Testing (DAST) because it tests the web application later in the development lifecycle (e.g., after release, in runtime) and is an important part of cybersecurity measures implemented by modern internet-based companies.

Successfully authenticating a web application as part of the dynamic application security testing process is an important consideration because web applications are no longer merely organizational assets. Instead, they form the very identity of modern corporations and thus play a major role in how customers and clients interact with such applications. Modern web applications have become more complex and at the same time targets for malicious attacks, where skillful attackers exploit potential vulnerabilities in such applications. Due to this increased risk calculus, customers require comprehensive scanning capabilities to discover potential vulnerabilities prior to exposure. Consequently, in order to be able to achieve the foregoing, customers require the ability to run fully authenticated attacks on their websites.

SUMMARY OF THE DISCLOSURE

Methods, systems, and processes related to an Automated Login Framework (ALF) for dynamic application security testing (DAST) are disclosed.

A web application executing on a computing device is accessed and an ALF is injected into an onload event of a web browser that the web application is executing on and the ALF is then accessed using a credential associated with the web application. A login page of the web application is identified by matching links or buttons with a user-defined regular expression (regex) and a user-defined wordlist and a login form in the login page is detected by executing a signature technique, a dictionary technique, and a multistep signature technique. The login form is populated using the credential and is submitted for authentication. A status with a confidence score is received indicating whether authentication of the credential was successful or failed.

In one embodiment, the signature technique includes findone TextAndOnePassFields, findPasswordAndPreceedingTextFiled, and findMultiStepOneEmailAndNoPassFields, and the dictionary technique includes findFieldsByClass, findFieldsByID, and findFieldsByName.

In another embodiment, a method, system, or process involves determining that elements in a document object model (DOM) associated with the web application are completely loaded as part of the onload event. In this example, the web application is built with a framework that creates a Shadow DOM, and the Shadow DOM is a hidden (or virtual) presentation of the DOM that exists entirely in runtime.

In some embodiments, a method, system, or process involves scanning the web application for security vulnerabilities if the authentication is successful, and ranking the security vulnerabilities for remediation based on a confidence score associated with the authentication. In this example, the confidence score is based on factors that include a login form displayed after factor, a login form removed factor, a login link displayed after factor, a login link removed factor, a logout link displayed after factor, and a regex matching factor.

In one embodiment, a method, system or process determines that successful authentication of the credential increases scan coverage of a web application scanner that is used to scan the web application for the security vulnerabilities. In this example, the successful authentication increases scan converge for a class of authentication-dependent web applications, and the class of authentication-dependent web applications depend on the credential being successfully validated prior to being scanned by the web application scanner so that the web application scanner gains further granular access to the web application by virtue of the successful authentication.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

Figure 1:
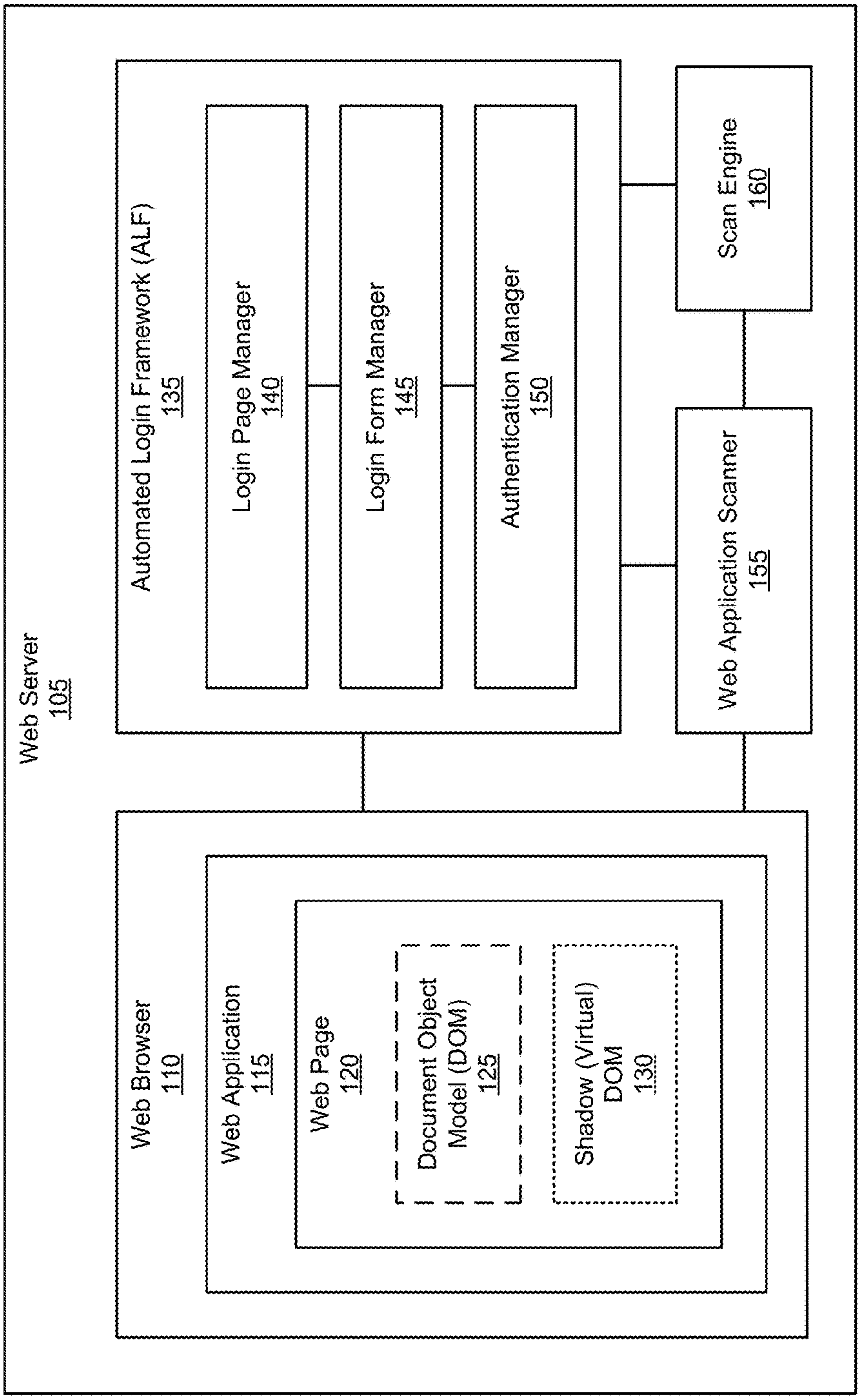
FIG. 1 is a block diagram 100 of a web server that can perform dynamic application security testing (DAST), according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Successfully performing automated and authenticated logins to web applications is a significant technology-related challenge in cybersecurity environments that implement dynamic application security testing (DAST). The failure of automated login(s) to such web applications requires security analysts to manually intervene with one of various cumbersome and resource-intensive alternatives (e.g., login macros, and the like). In many cases, security analysis who utilize DAST tools may simply give up and run unauthenticated scans—which provide less value and lower scan coverage.

Historically, a web application scanner analyzed hypertext markup language (HTML) returned by a web application to automatically search (the web application) for login forms and perform the login (e.g., prior to scanning). However, as modern web applications have evolved, the amount of HTML being sent from the web application is getting smaller, with a significant transition to JavaScript generation of web pages (e.g., JavaScript frameworks such as React.js, AngularJS, Vuc.js, Ember.js, and the like). Given this momentous transition, existing web application scanners and scanning techniques have failed to keep up.

Existing methodologies such as Macro and Bootstrap can enable a DAST engine to log into a website while crawling the website. However, both these technologies require user intervention for successful authentication and both have higher failure rates. For example, Macro and Bootstrap techniques require the user to record the authentication flow from finding the login page to populating the credential fields (e.g., with a username and/or password) and replay the user actions while the scan engine crawls the website. The foregoing is a time consuming process and can result in various errors during replay of user actions performed during the recording process of the macro and the bootstrap, thus resulting in failed authentication. Unfortunately, failed authentication leads to reduced scan coverage and poor customer experience.

Therefore, some technology-based disadvantages of existing techniques for authentication in DAST environments include, but are not limited to, (a) significant user interaction for recording macro and bootstrap for authentication, (b) failure to replay macro if the login flow is complex (e.g., if a website has multiple login steps), (c) interaction with incorrect elements (e.g., populating the wrong input fields) while replaying the macro and bootstrap because of a change in location of an element during the recording process (e.g., because of a change in the document object model (DOM), a change in user interaction, and the like), (d) poor or unsatisfactory performance (e.g., it can take a significant amount of time to replay each and every step a user records), and (c) false positives when detecting login forms for authentication.

To overcome the foregoing technological challenges in DAST environments, methods, systems, and processes related to an automated login framework (hereinafter ALF) are disclosed in various embodiments. In one embodiment, the ALF is an injectable framework (e.g., a JavaScript module) that can be injected into a web browser using a scan engine (or any other software tool that has the ability to do so). In one example, the ALF is based on JavaScript and can access the shadow DOM of a web page because the ALF is injected as a script (e.g., similar to the JavaScript the web page already has). Advantageously, the ALF can detect and identify a login form from the web page and can perform complex login operations automatically, thus providing an increase in successful authentications and enhanced scan coverage.

FIG. 1 is a block diagram 100 of a web server that can perform dynamic application security testing (DAST), according to one embodiment. As shown in FIG. 1, web server 105, which can be any type of physical or virtual computing device, includes at least a web browser 110 (e.g., any type of web browser that can handle JavaScript generation of web pages). Web application 115 executes in web browser 110 and includes a web page 120. Web page 120 includes a document object model (DOM) 125 as well as a shadow DOM 130 (also referred to as a virtual DOM). Web server 105 also includes a web application scanner 155 and a scan engine 160.

Scan engine 160 can be a cloud-based scan engine to test web applications that have been deployed to the public domain and are accessible from the Internet. For web applications that are not accessible from the Internet, scan engine 160 can also act as an on-premise scan engine. In this example, the on-premise scan engine (e.g., scan engine 160(2)) can scan web applications that cloud scan engines (e.g., scan engine 160(1)) cannot reach and can send the data back to web server 105 (and web application scanner 155). An agent (e.g., lightweight software that can be installed on computing devices—in the cloud or on-premises—to centralize and monitor data using a cloud security platform) can regularly check to determine if there are jobs for scan engine 160 to perform (e.g., like running a scan or updating the scan engine).

A Document Object Model (DOM) like DOM 125 is a cross-platform and language-independent interface that treats Extensible Markup Language (XML) or Hypertext Markup Language (HTML) documents as a tree structure where each node is an object that represents part of the document. Because of the shortcomings of relying on traditional DOM Application Programming Interfaces (APIs) to frequently create and update websites as is typically done in modern web applications, modern JavaScript frameworks (e.g., JavaScript frameworks such as React.js, AngularJS, Vue.js, Ember.js, and the like) utilize a lightweight abstraction methodology called Virtual DOM (or Shadow DOM 130) that is runtime generated to synchronize data with an user interface of a web application without refreshing the entire web application (e.g., web application 115 as shown in FIG. 1).

Web server 105 also includes an Automated Login Framework (ALF) 135. In one embodiment, ALF 135 is an extensible and injectable framework (e.g., a JavaScript framework) and includes at least a login page manager 140, a login form manager 145, and an authentication manager 150, and can be injected into web browser 110 (e.g., during a scan performed by web application scanner 155). In this example, the injection process is completed when web page 120 (e.g., a web site) is loaded into web browser 110. After web page 120 loads, ALF 135 has access to DOM 125 of web application 115 and the elements of web page 120.

In certain embodiments, the login process of ALF 135 (managed by login page manager 140) includes at least the following steps. These steps permit ALF 135 to accurately detect the login page and authentication into web page 120 for optimized and/or improved scan coverage. It should be noted that if the website (e.g., web page 120) is not authenticated, web application scanner 155 can miss a significant portion of the website coverage). The login process of ALF 135 includes at least: (1) injecting ALF 135 into an onload event of web browser 110, (2) calling ALF 135 with user credentials (e.g., a username and a password), (3) finding the login page using login page manager 140, (4) finding the login form using login form manager 145 (e.g., using various techniques such as NavigateByRegex and NavigateByXpath, (5) populating the login form (including multistep logins), (6) submitting the login form, and (7) returning a status (e.g., success or failure) with a confidence score generated by authentication manager 150, based on success of the authentication or failure of the authentication.

In one embodiment, ALF 135 is a JavaScript module and is injected into web application 115 and is executed on (or during) a load (or onload) event. For example, a load event is triggered when web page 120 is fully loaded, including dependent resources such as JavaScript files, Cascading Style Sheets (CSS) files, and images (e.g., in contrast to a DOMContentLoaded event, which is fired as soon as the DOM of web page 120 is loaded, without waiting for resources to finish loading). ALF 135 determines that one or more elements in DOM 125 associated with web application 115 (built with a framework that creates a Shadow DOM) are completely loaded as part of the onload event. Shadow DOM 130 is a hidden presentation of DOM 125 that exists entirely in runtime. Once the injection is complete, ALF 135 accesses and temporarily stores a username and a password associated with web application 115. The initial step of an authentication process involves finding a login page using login page manager 140. The login page can be detected or found using a NavigationByRegex technique and a NavigationByXPath technique.

Once the login page is found, ALF 135 executes at least a signature technique, a dictionary technique, and a multistep signature technique to detect and/or find one or more login fields and continues with the authentication process by clicking, triggering, or activating an authentication action button (e.g., a sign-in login button) on web page 120. Once ALF 135 click the action button, a detection process is executed to determine whether the login was successful and returns an object to a user with a status (e.g., an object indicating successful authentication or failure of the authentication).

Figure 2:
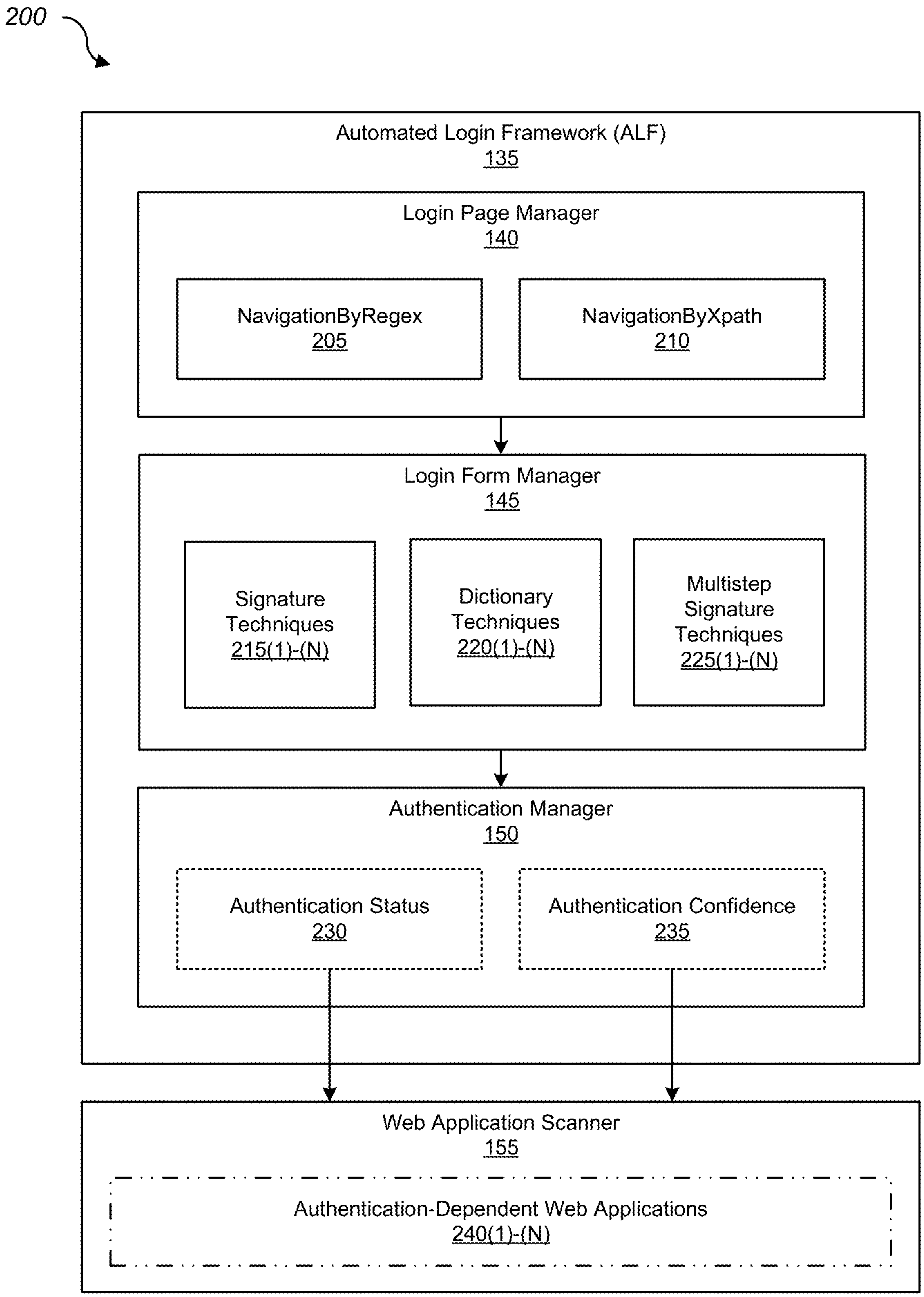
FIG. 2 is a block diagram 200 of an automated login framework (ALF) for DAST, according to one embodiment of the present disclosure.

FIG. 2 is a block diagram 200 of an automated login framework (ALF) for DAST, according to one embodiment. Scan engine 160 accesses web application 115 on web server 105 (or on any other computing device, if ALF 135 or scan engine 160 and/or web application scanner 155 are implemented separately from said computing device). Scan engine 160 then injects ALF 135 into an onload event of web browser 110 associated with web application 115 and accesses ALF 135 with a credential associated with web application 115.

Once called by scan engine 160, login page manager 140 takes over and identifies a login page of web application 115 using login page manager 140 by matching one or more links or one or more buttons with a user-defined regular expression (regex) (e.g., NavigationByRegex 205) and a user-defined wordlist (e.g., NavigationByXPath 210). Login form manager 145 then detects a login form in the login page by executing one or more signature techniques 215(1)-(N), one or more dictionary techniques 220(1)-(N), and one or more multistep signature techniques 225(1)-(N). Further, login form manager 145 of ALF 135 populates the login form using the credential, submits the login form for authentication by authentication manager 150, and receives a status (e.g., authentication status 230) with a confidence score (e.g., authentication confidence 235 of success or failure).

ALF 135 deploys various techniques for detecting login and authenticating into web page 120. In such example embodiments, signature, dictionary, and signature multistep techniques are deployed by ALF 135 to detect text fields for populating with usernames or email addresses, and passwords. One or more navigation techniques are deployed by ALF 135 to detect pages that have an authentication form (e.g., a login form) located on an authentication page (e.g., a login page). If the foregoing techniques fail, ALF 135 returns a failed result object with a status "failed" to web application scanner 155.

In one embodiment, Login Forms Dictionary, Navigation By Regex, and Navigation By Xpath techniques access a JavaScript Object Notation (JSON) file maintained by web server 105 that includes arrays of regex, xpath, element IDs, and classes inputted (e.g., by a user of web server 105) for ALF 135 to process.

In some embodiments, ALF 135 utilizes at least three different signature techniques (e.g., Login Forms Signature) for detecting login forms for populating the user input. These include at least: (1) findoneTextAndOnePassFields, which detects or looks for a single visible text input that is either a username or email address field, and detects a single visible password input, (2) findPasswordAndPreceedingTextField, which detects or looks for a login form with a password input preceded by text input such as a username or an email address, and (3) findMultiStepOneEmailAndNoPassFields, which detects or looks for a login form with one email address but no password fields (e.g., this technique can be implemented for logins with fields that are arranged in a step by step manner).

In other embodiments, ALF 135 utilizes at least three different dictionary techniques (e.g., Login Forms Dictionary) for detecting login forms for populating the user input. In this example, the login forms dictionary technique(s) utilize JSON files that have user inputted CSS classes and ID dictionaries for finding user inputs in a login form. ALF 135 matches text from dictionary files against an ID and classes of Hypertext Markup Language (HTML) elements in DOM 125. If there is a match, ALF 135 populates the fields with the supplied user credentials. If there is no match, ALF 135 returns a result object with failed status. Dictionary techniques include at least: (1) findFieldsbyClass, which accesses a dictionary file that contains a class list that is matched against an HTML element class property for detecting fields like username, email address, or password, (2) findFieldsByID, which accesses a dictionary file that contains a class list and is matched against a HTML element ID property for detecting fields like username, email address, or password, and (3) findFieldsByName, which accesses a dictionary file that contains a class list that is matched against a HTML name property for detecting user fields such as username, email address, or password.

In certain embodiments, one or more navigation techniques are used for detecting and/or finding pages (e.g., web page 120) that have the authentication form located on the authentication page. If there are none found, ALF 135 returns a failed object with failed status (e.g., authentication manager 150 indicates authentication status 230 has failed).

In one embodiment, navigationbyregex 205 accesses a user-specified regex and matchings against DOM element attributes for detecting login page links for authentication. In another embodiment, navigationbyxpath 210 accesses a list of user-specified xpaths and matches against DOM element attributes for finding login page links for authentication. If one or more signature techniques 215(1)-(N) or one or more dictionary techniques 220(1)-(N) (as described above) successfully detect the user credential fields, ALF 135 populates the fields with the credentials (e.g., a username, an email address, and if required, a password). After the population is complete, ALF 135 finds an action button using user supplied regex and xpath wordlist(s) and clicks the action button (e.g., "sign in", "login", etc.) for authenticating the user. Once the login process is complete, ALF 135 runs a user supplied regex to check whether the user is logged in or not (e.g., ALF 135 detects the existence of a "log out" or "sign out" link). If the user is logged in, ALF 135 returns a success result object. If the user is not logged in, ALF 135 returns a failed result object. In this example, the determination of success of failure is based on a combination of authentication status 230 as determined by ALF 135 and authentication confidence 235 (e.g., the confidence or reliability behind authentication status 230 based on various factors).

In one embodiment, web application scanner 155 (a) scans web application 115 for one or more security vulnerabilities if authentication manager 150 indicates that the authentication is successful, and (b) ranks the one or more security vulnerabilities for remediation based on a confidence score associated with the authentication. In some embodiments, the confidence score (e.g., authentication confidence 23) is based on several factors, that include, but are not limited to: (1) a login form displayed after (authentication) factor, (2) a login form removed (after authentication) factor, (3) a login link displayed after (authentication) factor, (4) a login link removed (after authentication) factor, (5) a logout link displayed after (authentication) factor, and (6) a regex matching factor.

Advantageously, ALF 135 can also determine that successful authentication of a given credential can increase scan coverage of web application scanner 155 that is used to scan web application 115 (e.g., shown as authentication-dependent applications 240(1)-(N) in FIG. 2) for the aforementioned one or more security vulnerabilities. Some examples features that can be indicative of such security vulnerabilities include, but are not limited to: account visits suspicious link, password set to never expire, network access for threat, asset connects to network honeypot, watched impersonation, account authenticated to critical asset, lateral movement domain credentials, lateral movement local credentials, suspicious authentication, wireless multiple country authentications, multiple country authentications, ingress from non-expiring account, ingress from ServiceAccount, service account authenticated from new source, account authenticated to critical asset from new source, new local user primary asset, ingress from disabled account, authentication attempt from disabled account, brute force against domain account, brute force against local account, brute force from unknown source, remote file execution, VirusAlert, log deletion local account, harvested credentials, log deletion, virus alert, network access for threat, malicious hash on asset, advanced malware alert, protocol poison, administrator impersonation, account privilege escalated, account enabled, account password reset, account located, Domain-Admin enabled, and the like.

Therefore, successful authentication increases scan coverage of authentication-dependent web applications 240(1)-(N). In some embodiments, such authentication-dependent web applications 240(1)-(N) are a class of web applications (e.g., web application 115) that depend on a credential (e.g., a username/email and password) being successfully validated prior to being scanned by web application scanner 155. In this example, the foregoing dependency is caused by web application scanner 155 requiring (and gaining) further granular access to web application 115 by virtue of the successful authentication. Certain applications cannot be successfully crawled and scanned by web application scanner 155 if those applications either (a) cannot be authenticated or (b) do not require authentication. Web applications that require validation are of particular interest to malicious attackers as authentication indicates something of value that can be gleaned or stolen from the web application. Therefore, in one embodiment, web application scanner 155 excludes all web applications executing on web server 105 that are (a) cannot be authenticated successfully (e.g., ALF 135's authentication process failed) or (b) do not require authentication from scanning, crawling, and remediation operations. In this example, web application scanner 155 only includes one or more web applications that are part of authentication-dependent web applications 240(1)-(N) that have been successfully authenticated by ALF 135 above a certain confidence threshold (e.g., successful authentication status 230(1)+80% authentication confidence 235(1) based on four of five positive confidence factors, or failed authentication status 230(2)+40% authentication confidence score 235(2) based on only two of five positive confidence factors—where each confidence factor accounts for 20% of the total confidence score). In one embodiment, an authentication is given a successful status only if three of five confidence factors discussed above are met (or positive) and the confidence score is a minimum of 60% (if each factor is assigned a weight of 20%). As noted, the five factors are: (1) a login form displayed after factor, (2) a login form removed factor, (3) a login link displayed after factor, (4) a login link removed factor, (5) a logout link displayed after factor, and (6) a regex matching factor.

Figure 3:
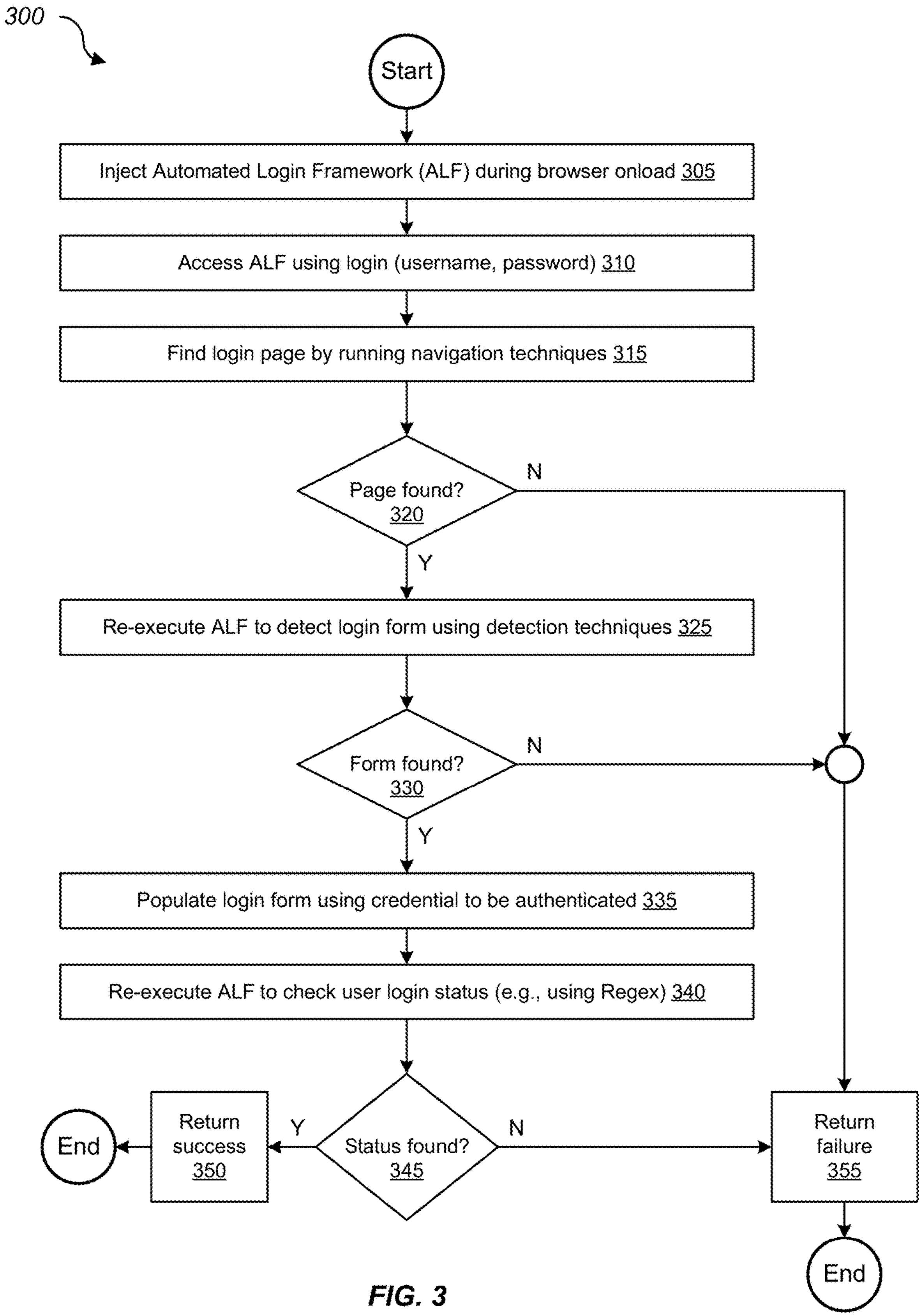
FIG. 3 is a flowchart 300 that illustrates a process for using the ALF as part of a DAST operation, according to one embodiment of the present disclosure.

FIG. 3 is a flowchart 300 that illustrates a process for using the ALF as part of a DAST operation, according to one embodiment. The process of FIG. 3 can be performed in conjunction by scan engine 160 and ALF 135. The process begins at 305 by injecting ALF 135 during web browser 110's onload, and at 310, accesses ALF 310 using a login (username/email, password). Steps 305 and 310 can be performed by scan engine 160 that is implemented separately from ALF 135 (as shown in FIG. 1). At 315, ALF 135 takes over the process and finds (e.g., detects) a login page (e.g., a login page of web page 120) by running (or executing) one or more navigation techniques (e.g., at least NavigateByRegex 205 and NavigateByXpath 210 as provided by login page manager 140). At 320, the process determines if the (login) page has been detected or found by ALF 135. If the login page is not found, the process ends at 355 by return(ing) failure 355.

If the login page is found or detected, at 325, ALF 135 is re-executed by scan engine 160 to detect a login form using one or more detection techniques (e.g., signature techniques 215(1)-(N), dictionary techniques 220(1)-(N), and multistep signature techniques 225(1)-(N)). As noted, and in this example, the signature techniques include findoneTextAndOnePassFields, findPasswordAndPreceedingTextFiled, and findMultiStepOneEmailAndNoPassFields, and the dictionary techniques include findFieldsByClass, findFieldsByID, and findFieldsByName.

At 330, the process determines if the (login) form has been detected or found by ALF 135 (e.g., by login form manager 145 using one or more signature techniques 215 (1)-(N), one or more dictionary techniques 220(1)-(N), and one or more multistep signature techniques 225(1)-(N)). If the login form is not found, the process ends at 355 by return(ing) failure 355. However, if the login page is found or detected, the process, at 335, populates the login form using the credential to be authenticated, and at 340, re-executes ALF 135 to check user login status (e.g., using Regex). At 345, the process determines whether the status exists. If the status exists and is found, the process ends at 350 by return(ing) success 350. However, if the status does not exist or is not found, the process ends at 355 by return(ing) failure 355.

Figure 4:
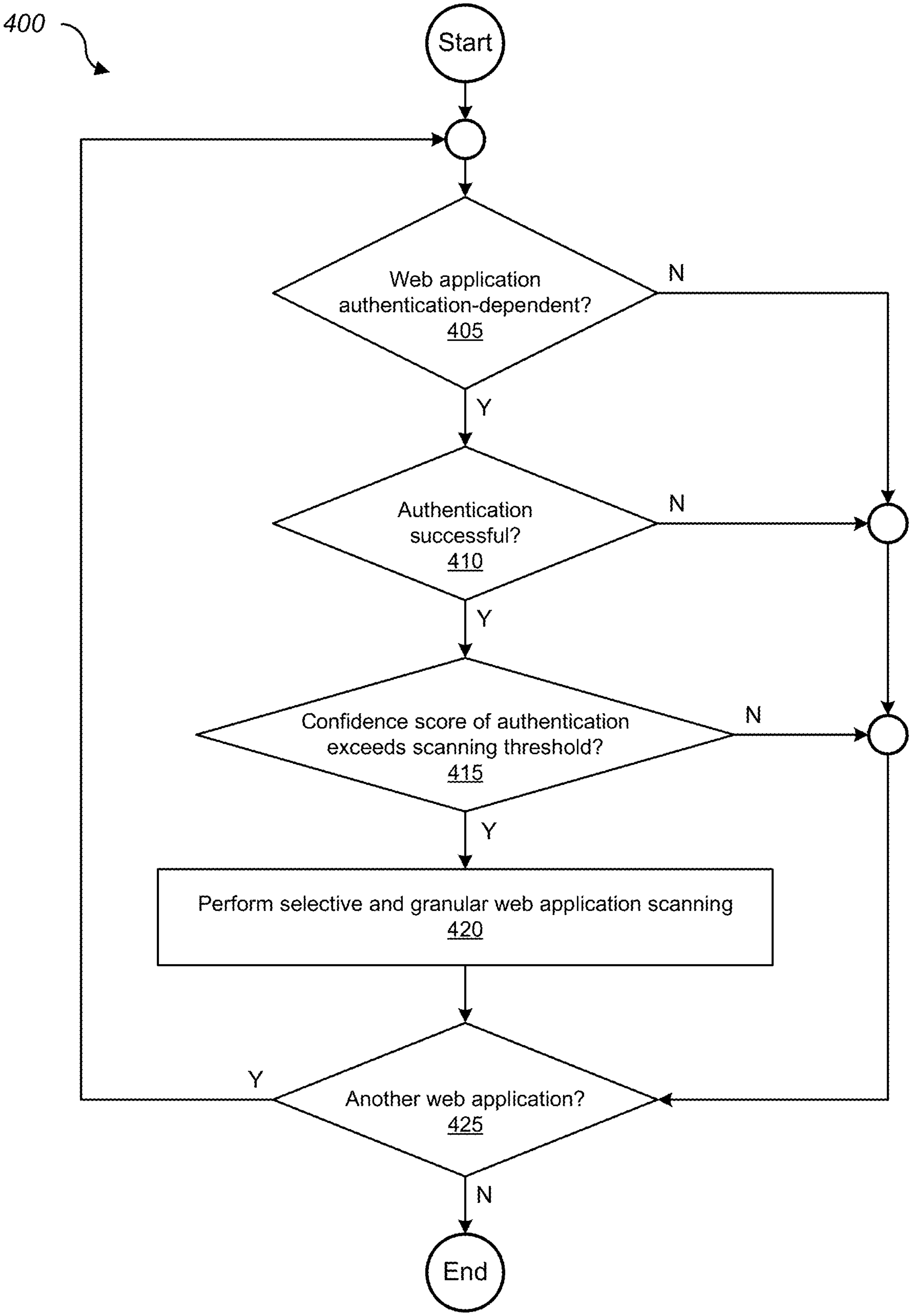
FIG. 4 is a flowchart 400 that illustrates a process for performing selective and granular web application scanning, according to one embodiment of the present disclosure.

FIG. 4 is a flowchart 400 that illustrates a process for performing selective and granular web application scanning, according to one embodiment. The process begins at 405 by determining whether a given web application (e.g., web application 115) is authentication-dependent (e.g., for scanning). As noted, authentication-dependent web applications are web applications where vulnerability (and other security) assessment(s) and remediation is dependent on successfully authenticating such web applications automatically—without human intervention and without the use of cumbersome macros and bootstraps. In addition, authentication-dependent web applications are typically targeted by one or more certain classes of vulnerabilities that render web applications that require authentication particularly vulnerable (e.g., broken authentication, security misconfiguration, sensitive data exposure, missing function level access control, cross site request forgery (CSRF), and the like). ALF 135 and/or scan engine 160 can determine whether a given web application is authentication-dependent based on metadata associated with the web application in addition to whether the web application is associated with an authentication requirement for scanning and crawling (e.g., such an association and requirement can be maintained in the form of a catalog or a list by web server 105).

At 410, the process determines whether the authentication is successful. If the authentication is unsuccessful, the process loops to 425 by determining if there is another web application. If there is another web application, the process loops to 405. Otherwise, the process ends. However, if the authentication is successful, the process, at 415, determines whether a confidence score (e.g., authentication confidence 235) of the authentication exceeds a scanning threshold (e.g., at least a 60% threshold with at least three of five factors being met or positive, where each factor has a weight of 20%). However, if the confidence score of the authentication does not exceed the scanning threshold, the process loops to 425 and determines if there is another web application (to process). If there is another web application, the process loops to 405. Otherwise, the process ends.

If the confidence score of the authentication exceeds the scanning threshold, the process, at 420, performs selective and granular web application scanning—e.g., by excluding unauthenticated and authentication-independent applications from web application crawling and scanning by web application scanner 155 and including only one or more of authentication-dependent web applications 240(1)-(N) that have been successfully authenticated (e.g., success authentication status 230) and possess a confidence score above a modifiable threshold (e.g., authentication confidence 235 indicated by at least two positive confidence factors (40%), at least three positive factors (60%), and the like). At 425, the process determines if there is another web application (to process). If there is another web application, the process loops to 405. Otherwise, the process ends.

Figure 5:
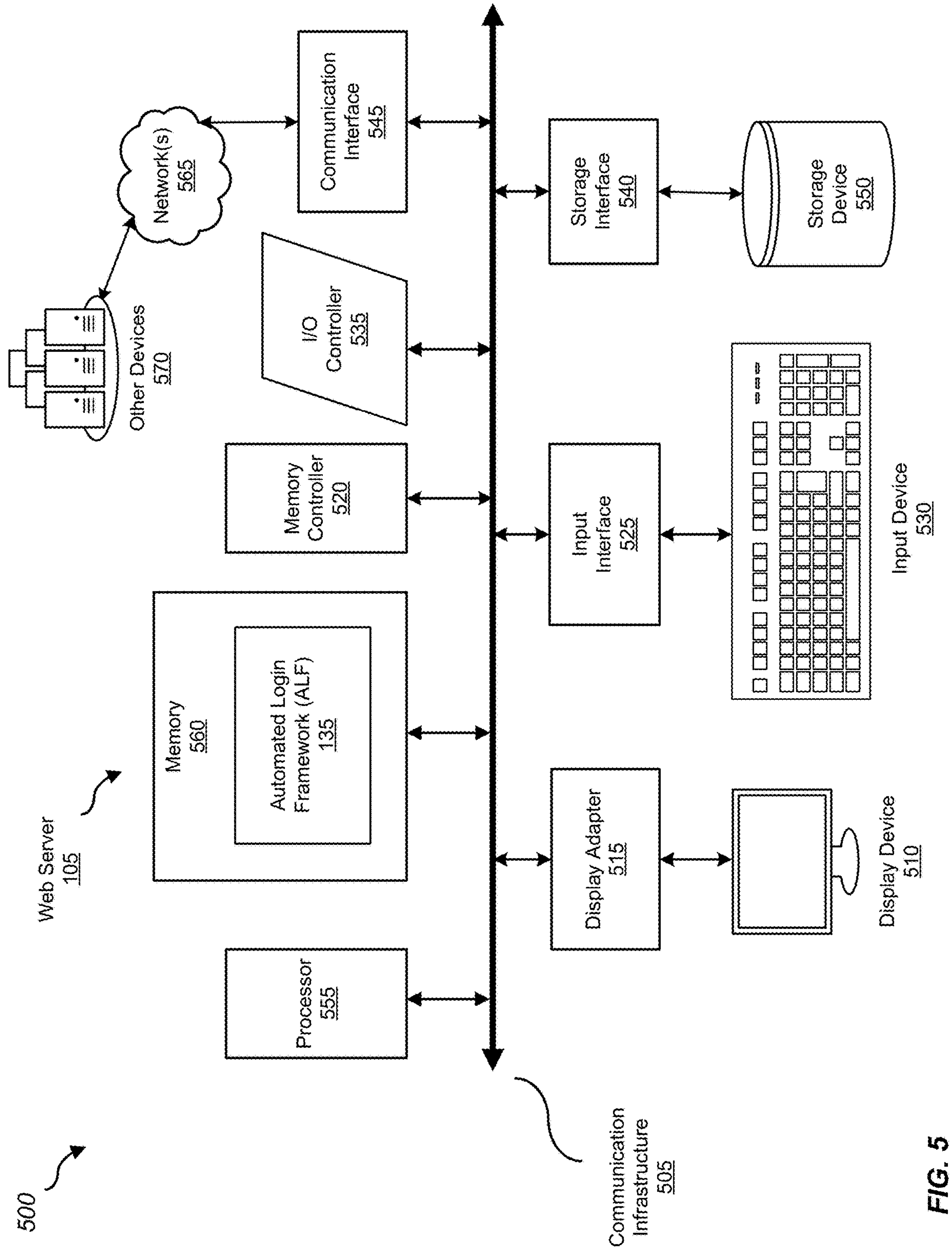
FIG. 5 is a block diagram 500 of a computing and networking system, illustrating how an ALF can be implemented in software, according to one embodiment of the present disclosure.

FIG. 5 is a block diagram 500 of a computing and networking system, illustrating how an ALF can be implemented in software, according to one embodiment. Computing system 500 can include web server 105 and broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 500 may include at least one processor 555 and a memory 560. By executing the software that executes ALF 135 computing system 500 becomes a special purpose computing device that is configured to provide an automated login framework for dynamic application security testing.

Processor 555 generally represents any type or form of processing unit capable of processing data or interpreting and executing instructions. In certain embodiments, processor 555 may receive instructions from a software application or module. These instructions may cause processor 555 to perform the functions of one or more of the embodiments described and/or illustrated herein. For example, processor 555 may perform and/or be a means for performing all or some of the operations described herein. Processor 555 may also perform and/or be a means for performing any other operations, methods, or processes described and/or illustrated herein.

Memory 560 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 500 may include both a volatile memory unit and a non-volatile storage device. In one example, program instructions implementing ALF 135 may be loaded into memory 560.

In certain embodiments, computing system 500 may also include one or more components or elements in addition to processor 555 and/or memory 560. For example, as illustrated in FIG. 5, computing system 500 may include a memory controller 520, an Input/Output (I/O) controller 535, and a communication interface 545, each of which may be interconnected via a communication infrastructure 505. Communication infrastructure 505 generally represents any type or form of infrastructure capable of facilitating communication between one or more components of a computing device. Examples of communication infrastructure 505 include, without limitation, a communication bus (such as an Industry Standard Architecture (ISA), Peripheral Component Interconnect (PCI), PCI express (PCIe), or similar bus) and a network.

Memory controller 520 generally represents any type/form of device capable of handling memory or data or controlling communication between one or more components of computing system 500. In certain embodiments memory controller 520 may control communication between processor 555, memory 560, and I/O controller 535 via communication infrastructure 505. In certain embodiments, memory controller 520 may perform and/or be a means for performing, either alone or in combination with other elements, one or more of the operations or features described and/or illustrated herein. I/O controller 535 generally represents any type or form of module capable of coordinating and/or controlling the input and output functions of a computing device. For example, in certain embodiments I/O controller 535 may control or facilitate transfer of data between one or more elements of computing system 500, such as processor 555, memory 560, communication interface 545, display adapter 515, input interface 525, and storage interface 540.

Communication interface 545 broadly represents any type/form of communication device/adapter capable of facilitating communication between computing system 500 and other devices and may facilitate communication between computing system 500 and a private or public network. Examples of communication interface 545 include, a wired network interface (e.g., network interface card), a wireless network interface (e.g., a wireless network interface card), a modem, and any other suitable interface. Communication interface 545 may provide a direct connection to a remote server via a direct link to a network, such as the Internet, and may also indirectly provide such a connection through, for example, a local area network. Communication interface 545 may also represent a host adapter configured to facilitate communication between computing system 500 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 500 may also include at least one display device 510 coupled to communication infrastructure 505 via a display adapter 515 that generally represents any type or form of device capable of visually displaying information forwarded by display adapter 515. Display adapter 515 generally represents any type or form of device configured to forward graphics, text, and other data from communication infrastructure 505 (or from a frame buffer, as known in the art) for display on display device 510. Computing system 500 may also include at least one input device 530 coupled to communication infrastructure 505 via an input interface 525. Input device 530 generally represents any type or form of input device capable of providing input, either computer or human generated, to computing system 500. Examples of input device 530 include a keyboard, a pointing device, a speech recognition device, or any other input device.

Computing system 500 may also include storage device 550 coupled to communication infrastructure 505 via a storage interface 540. Storage device 550 generally represents any type or form of storage devices or mediums capable of storing data and/or other computer-readable instructions. For example, storage device 550 may include a magnetic disk drive (e.g., a so-called hard drive), a floppy disk drive, a magnetic tape drive, an optical disk drive, a flash drive, or the like. Storage interface 540 generally represents any type or form of interface or device for transmitting data between storage device 550, and other components of computing system 500. Storage device 550 may be configured to read from and/or write to a removable storage unit configured to store computer software, data, or other computer-readable information. Examples of suitable removable storage units include a floppy disk, a magnetic tape, an optical disk, a flash memory device, or the like. Storage device 550 may also include other similar structures or devices for allowing computer software, data, or other computer-readable instructions to be loaded into computing system 500. For example, storage device 550 may be configured to read and write software, data, or other computer-readable information. Storage device 550 may also be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5. Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 500. All or a portion of the computer program stored on the computer-readable medium may then be stored in memory 560, and/or various portions of storage device 550. When executed by processor 555, a computer program loaded into computing system 500 may cause processor 555 to perform and/or be a means for performing the functions of one or more of the embodiments described/illustrated herein. Alternatively, one or more of the embodiments described and/or illustrated herein may be implemented in firmware and/or hardware.

Network 565 generally represents any type or form of computer network or architecture capable of facilitating communication between web server 105 and ALF 135, web application scanner 155, and/or scan engine 160—if these latter three components are implemented on different computing devices or on computing devices different than web server 105 (e.g., on one or more of devices 570). Network 565 can be a Wide Area Network (WAN) (e.g., the Internet) or a Local Area Network (LAN). In certain embodiments, a communication interface, such as communication interface 545 in FIG. 5, may be used to provide connectivity between web server 105 and ALF 135, web application scanner 155, and/or scan engine 160, and network 565. The embodiments described and/or illustrated herein are not limited to the Internet or any particular network-based environment.

In some embodiments, ALF 135, web application scanner 155, and scan engine 160 may be part of web server 105 respectively, or may be separate. If separate, ALF 135, web application scanner 155, and/or scan engine 160, and web server 105 may be communicatively coupled via network 565. In one embodiment, all or a portion of one or more of embodiments may be encoded as a computer program and loaded onto and executed by ALF 135, web application scanner 155, and scan engine 160, or any combination thereof, and may be stored on web server 105 and distributed over network 565.

In some examples, all or a portion of web server 105, ALF 135, web application scanner 155, and/or scan engine 160 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, ALF 135 may transform the behavior of web server 105 to perform automated login authentications for dynamic application security testing purposes.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method, comprising:

performing, by a dynamic application security testing (DAST) system:

accessing, via a web browser, a website hosted at a web server;

injecting an automated login framework (ALF) module into a web application received from the web server, wherein:

the web application generates a document object model (DOM), the web application is build using a web application framework that creates a shadow DOM in a runtime of the web application framework that is a hidden representation of the DOM, the ALF module is a JavaScript module, and the ALF module is configured to access the DOM and the shadow DOM;

causing the browser to execute the ALF module to perform a login via the web application, wherein the execution comprises:

identifying a login page generated by the web application, identifying a login form within the login page, populating the login form with login data including a credential, submitting the login data to the web server for authentication, and generating an indication that the authentication is successful; and performing an authenticated scan of the web application after the login.

2. The method of claim 1, wherein the credential is supplied as an input parameter to the ALF module and comprises a username and a password, the ALF module is a JavaScript module, and the ALF module is configured to access elements of a document object model (DOM) generated by the web application.

3. The method of claim 1, wherein the indication that the authentication is successful is determined based on detection of a "log out" or "sign out" DOM element after submission of the login data, the web application is build using a web application framework that creates a shadow DOM, the shadow DOM is a hidden representation of the DOM that exists in a runtime of the web application framework, and the ALF module is configured to access the shadow DOM.

4. The method of claim 1, wherein

The ALF module is injected on an onload event of the web application.

5. The method of claim 1, wherein the login page is identified based on match of DOM elements with a list of user-defined regular expressions, words, or xpaths.

6. The method of claim 1, wherein the login form is identified using a plurality of form identification techniques including a signature technique, a dictionary technique, and a multistep signature technique.

7. The method of claim 1, wherein the indication is generated based on a confidence score of whether the login succeeded or failed, wherein the confidence score is based on a plurality of factors observed during the login.

8. The method of claim 1, wherein the injecting of the ALF module and the executing of the ALF module are performed automatically without human intervention.

9. The method of claim 1, wherein the authenticated scan assesses the web application for different types of security vulnerabilities.

10. The method of claim 1, wherein the authenticated scan performs a crawl of at least a portion of the website via the web application.

11. A system, comprising:

one or more compute systems having a hardware processor and memory that implement a dynamic application security testing (DAST) system, configured to:

access, via a web browser, a website hosted at a web server;

inject an automated login framework (ALF) module into a web application received from the web server, wherein:

the web application generates a document object model (DOM), the web application is build using a web application framework that creates a shadow DOM in a runtime of the web application framework that is a hidden representation of the DOM, the ALF module is a JavaScript module, and the ALF module is configured to access the DOM and the shadow DOM;

cause the browser to execute the ALF module to perform a login via the web application, comprising:

identifying a login page generated by the web application, identifying a login form within the login page, populating the login form with login data including a credential, submitting the login data to the web server for authentication, and generating an indication that the authentication is successful; and perform an authenticated scan of the web application after the login.

12. The system of claim 11, wherein the authenticated scan of the web application includes examining an account associated with the credential for indications of security vulnerabilities, the ALF module is a JavaScript module, and the ALF module is configured to access elements of a document object model (DOM) generated by the web application.

13. The system of claim 12, wherein the indications of security vulnerabilities include one or more of:

suspicious authentication to the account, account authentication from a new source, account visits to a suspicious link or honeypot network, an escalation of privilege of the account, and a virus or malware alert associate with the account, the web application is build using a web application framework that creates a shadow DOM the shadow DOM is a hidden representation of the DOM that exists in a runtime of the web application framework, and the ALF module is configured to access the shadow DOM.

14. The system of claim 11, wherein the ALF module is injected on an onload event of the web application.

15. The system of claim 11, wherein the login page is identified based on match of DOM elements with a list of user-defined regular expressions, words, or xpaths.

16. The system of claim 15, wherein the list of user-defined regular expressions, words, or xpaths is obtained from a JavaScript Objection Notation (JSON) file.

17. The system of claim 11, wherein the credential is supplied as an input parameter to the ALF module and comprises a username and a password.

18. The system of claim 11, wherein the DAST system is deployed at a premises of the web server being scanned.

19. The system of claim 11, wherein the DAST system is deployed in a cloud data center remote from the web server.

20. The system of claim 11, wherein the indication that the authentication is successful is determined based on detection of a "log out" or "sign out" DOM element after submission of the login data.

* * * * *